US010450207B2

(12) United States Patent
Giraldo

(10) Patent No.: US 10,450,207 B2
(45) Date of Patent: Oct. 22, 2019

(54) SYSTEMS AND METHODS FOR TREATING PRODUCED WATER

(71) Applicant: NATURAL SYSTEMS UTILITIES, LLC, Hillsborough, NJ (US)

(72) Inventor: Eugenio Giraldo, Robbinsville, NJ (US)

(73) Assignee: NATURAL SYSTEMS UTILITES, LLC, Hillsborough, NJ (US)

(*) Notice: Subject to any disclaimer, the term of this patent is extended or adjusted under 35 U.S.C. 154(b) by 1055 days.

(21) Appl. No.: 14/796,665

(22) Filed: Jul. 10, 2015

(65) Prior Publication Data

US 2015/0307374 A1 Oct. 29, 2015

Related U.S. Application Data

(63) Continuation-in-part of application No. PCT/US2014/012336, filed on Jan. 21, 2014.

(60) Provisional application No. 62/023,582, filed on Jul. 11, 2014, provisional application No. 61/754,691, filed on Jan. 21, 2013.

(51) Int. Cl.
| | | |
|---|---|---|
| C02F 9/00 | (2006.01) | |
| C02F 1/469 | (2006.01) | |
| C02F 1/44 | (2006.01) | |
| C02F 101/32 | (2006.01) | |
| C02F 103/10 | (2006.01) | |
| C02F 1/24 | (2006.01) | |
| C02F 1/28 | (2006.01) | |
| C02F 1/00 | (2006.01) | |
| C02F 103/36 | (2006.01) | |

(52) U.S. Cl.
CPC .............. *C02F 1/4693* (2013.01); *C02F 9/00* (2013.01); *C02F 1/24* (2013.01); *C02F 1/283* (2013.01); *C02F 1/441* (2013.01); *C02F 1/444* (2013.01); *C02F 2001/007* (2013.01); *C02F 2101/32* (2013.01); *C02F 2103/10* (2013.01); *C02F 2103/365* (2013.01); *C02F 2303/10* (2013.01); *Y02W 10/30* (2015.05)

(58) Field of Classification Search
CPC .. C02F 1/4693; C02F 9/00; C02F 1/24; C02F 1/283; C02F 2001/007; C02F 2103/365; C02F 2103/10; C02F 2101/32; C02F 1/444; C02F 1/441; C02F 2303/10; C02F 1/02; C02F 1/40; C02F 1/469; Y02W 10/30; B01D 17/02; B01D 17/0208; E21B 21/06; E21B 21/063
USPC ........ 60/641.2; 61/2, 25, 4, 14, 147; 175/66, 175/206, 207; 210/175, 650–652, 774, 210/799, 804, 806
See application file for complete search history.

(56) References Cited

U.S. PATENT DOCUMENTS

| | | | |
|---|---|---|---|
| 2,232,839 A | * | 2/1941 | Carter .................. C07C 2/38 417/66 |
| 4,557,112 A | | 12/1985 | Smith |
| 4,699,719 A | | 10/1987 | Finley |
| 7,520,993 B1 | | 4/2009 | Laraway et al. |
| 7,718,069 B2 | | 5/2010 | Laraway et al. |
| 2007/0144785 A1 | | 6/2007 | Smith et al. |
| 2007/0261844 A1 | | 11/2007 | Cogliandro et al. |

(Continued)

*Primary Examiner* — Mark A Laurenzi
*Assistant Examiner* — Mickey H France
(74) *Attorney, Agent, or Firm* — Lando & Anastasi, LLP

(57) ABSTRACT

Integrated systems and methods wherein the separation and treatment of produced water may be driven by energy harvested from the produced water.

17 Claims, 8 Drawing Sheets

(56) References Cited

U.S. PATENT DOCUMENTS

| | | |
|---|---|---|
| 2009/0301087 A1 | 12/2009 | Borissov et al. |
| 2010/0122534 A1* | 5/2010 | Ast .................. F01K 23/10 60/651 |
| 2010/0236595 A1 | 9/2010 | Bell et al. |
| 2010/0282593 A1 | 11/2010 | Speirs et al. |
| 2010/0294719 A1 | 11/2010 | Polizzotti et al. |

* cited by examiner

SYSTEMS AND METHODS FOR TREATING PRODUCED WATER

CROSS-REFERENCE TO RELATED APPLICATIONS

This application is a continuation in part of International (PCT) Patent Application Serial No. PCT/US2014/012336, filed Jan. 21, 2014, which claims the benefit of and priority to U.S. Provisional Patent Application Ser. No. 61/754,691, filed Jan. 21, 2013. This application also claims the benefit of and priority to U.S. Provisional Patent Application Ser. No. 62/023,582, filed Jul. 11, 2014. The entire disclosure of each application identified above is hereby incorporated herein by reference in its entirety for all purposes.

FIELD OF THE TECHNOLOGY

One or more aspects relate generally to energy production, and more particularly to systems and methods for treating water used in oil and gas extraction.

BACKGROUND

To meet energy and manufacturing needs, oil and gas are routinely extracted from underground sources. Conventional oil and gas extraction is a water intensive process. Produced water is typically unfit for discharge into local water sources and may be injected into underground wells for disposal. Alternatively, produced water may be treated to render it suitable for a variety of uses.

SUMMARY

In accordance with one or more aspects, integrated systems and methods for energy production are disclosed.

In accordance with one or more aspects, a method for treating produced water may comprise recovering heat energy from the produced water, and using the recovered heat energy to directly drive treatment of the produced water.

In some aspects, recovering heat energy from the produced water comprises converting heat energy to mechanical energy. The mechanical energy may be used to separate oil and/or contaminants from the produced water. Recovering heat energy from the produced water may further comprise converting the mechanical energy to electrical energy. Recovering heat energy from the produced water may comprise using a heat engine in fluid communication with a generator to convert the recovered heat energy to electrical energy. Recovering heat energy from the produced water may comprise using a thermoelectric generator to convert the recovered heat energy to electrical energy.

In some aspects, the method may further comprise delivering excess recovered heat energy to an energy network. An energy network may be used to supplement the recovered heat energy or as a backup source of power. In at least some aspects, the heat energy may be recovered prior to separating oil from the produced water. In other aspects, the heat energy may be recovered during treatment of the produced water.

In accordance with one or more aspects, a system for providing energy to treat produced water may comprise a source of produced water having heat energy, a water treatment subsystem having an energy requirement and fluidly connected downstream of the source of produced water, and an energy recovery subsystem configured to convert a portion of the heat energy from the produced water to mechanical and/or electrical energy, and to supply at least a portion of the energy requirement of the water treatment system.

In some aspects, the energy recovery subsystem may comprise a generator disposed in communication with a turbine to generate electrical energy. In some non-limiting aspects, the turbine may comprise a two-phase turbine. In at least some aspects, the water treatment subsystem may comprise an oil-water separator and at least one of a microfiltration unit, an activated carbon media unit, a reverse osmosis unit, and an electrodialysis unit. The energy recovery subsystem may comprise a heat engine configured to operate in accordance with a trilateral thermodynamic energy conversion cycle.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosed embodiments, and are not intended as a definition of the limits of such embodiments. For purposes of clarity, not every component may be labeled in every drawing. In the following description, various embodiments are described with reference to the following drawings, in which.

DETAILED DESCRIPTION

Figure 1:
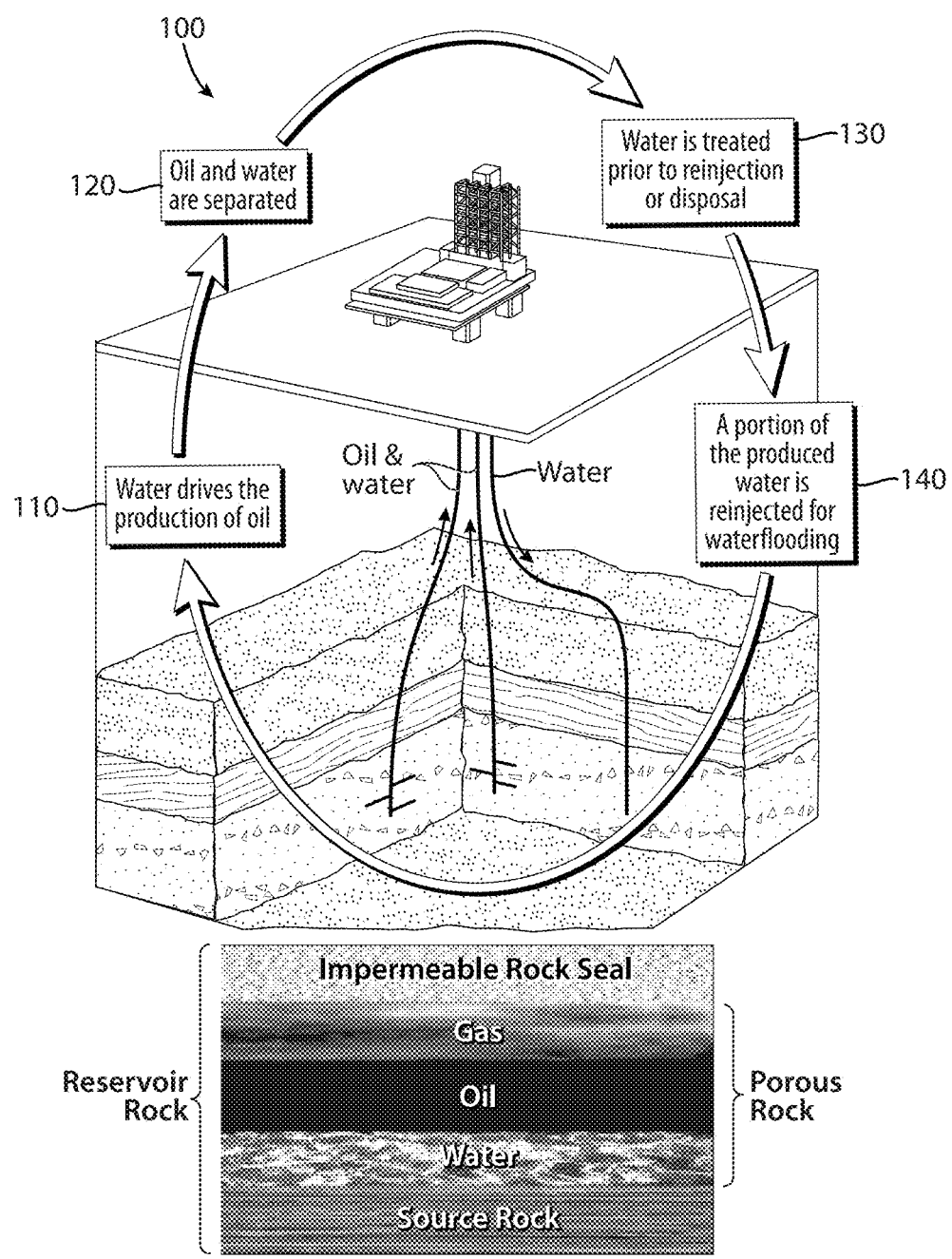
FIG. 1 presents a schematic of a conventional water cycle during oil and gas extraction operations in accordance with one or more embodiments.

Various embodiments described herein are not limited in their application to the details of construction and the arrangement of components as set forth in the following description or illustrated in the drawings. One or more embodiments are capable of being practiced or carried out in various ways beyond those exemplarily presented herein.

Treatment of produced water has become increasingly attractive in view of the expense and potential environmental drawbacks relating to water use and disposal. Onsite treatment of produced water has various challenges, however, particularly the large energy demand associated with such operations. Gas wells are often located in remote locations, limiting access to large energy grids. Operating and fueling on-site generators to supply the energy required for treatment can be cost prohibitive. In accordance with one or more embodiments disclosed herein, systems and methods may beneficially extract heat energy from produced water and use it to power onsite treatment of the produced water. This integration may enable greater efficiency of overall oil and gas extraction operations. While some disclosed embodiments relate specifically to produced water associated with oil and gas extraction, one or more aspects may be applied to any source of water to be treated. For example, heat may be extracted from water associated with geothermal applications as well as from various industrial or refinery water streams. In some embodiments, heat may be recovered from process streams associated with metal casting or the manufacture of cement, iron, steel, aluminum and glass. The recovered energy may then be used to treat the water from which the heat was extracted. The following discussion regarding energy recovery and its use in water treatment may therefore be applied to any source of water to be treated.

A schematic of a water cycle in a conventional oil and gas extraction operation is presented in FIG. 1. In a first step 110, injected water may be used to drive oil or gas to the surface at a well head. The injected water and/or the existing water in the formation surfaces as a mixture, or emulsion, known as "produced water" that includes the oil and gas products. A typical water to oil ratio may be about 5-10:1 but may vary greatly. Temperatures at the depth under the earth's surface where oil and gas yielding formations exist are generally high, which causes the water to become heated. In some embodiments, the produced water may be at a temperature in the range of about 100° F. to about 750° F. In some specific non-limiting embodiments, the produced water may be at about 170° F.

In a second step 120 of the water cycle, the water portion and oil portion of the produced water are separated by various unit operations, as discussed in greater detail below with reference to FIG. 2. In a third step 130 of the water cycle, portions of the separated water stream may undergo different treatment operations depending on their intended use. If the water is intended for reinjection to permanent well disposal or for waterflooding, then further treatment may be minimal. For example, in a fourth step 140 of the illustrated water cycle, a portion of the produced water is reinjected for waterflooding to enhance water production. Alternatively, minimally treated produced water may be injected in an underground well for disposal (not shown). If the intended use requires an improved water quality, such as for irrigation, then a more robust water treatment may be required as discussed in greater detail below with reference to FIG. 3.

Figure 2:
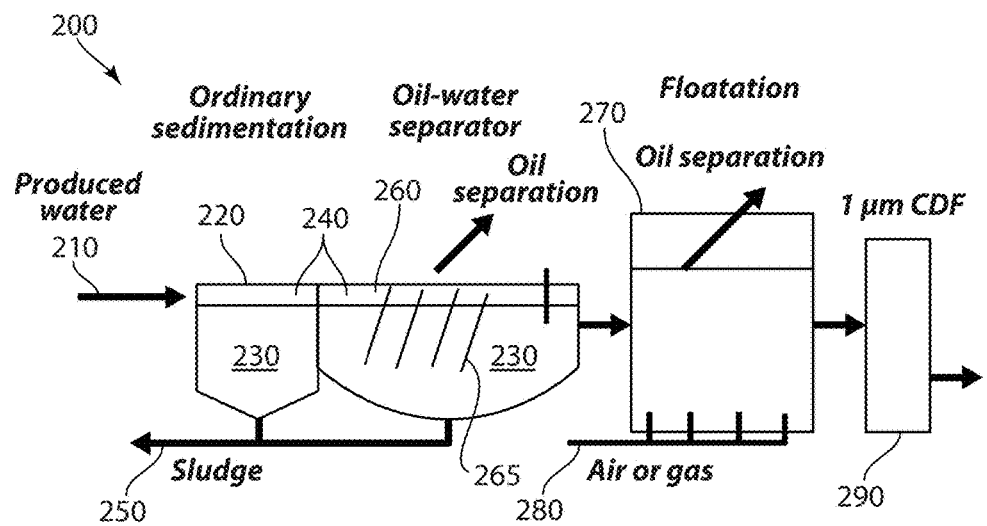
FIG. 2 presents a schematic of a produced water treatment process in accordance with one or more embodiments.

FIG. 2 presents a non-limiting schematic of a method for oil and gas separation from produced water in accordance with one or more embodiments. The produced water 210 may enter an oil/water separation train 200 and may first undergo treatment in a gravity separation device 220 to separate the oil from the water. Various gravity separation devices and other appropriate unit operations will be readily apparent to those of ordinary skill in the art. Typically, gravity separation devices may operate based on the specific gravity differences between oil and water. Given time, the less dense oil will form an oil layer 240 that floats on top of the denser water layer 230. Likewise, particulate matter will sink to the bottom of the water layer and will be drained out as part of a sludge 250. Hydrocarbons in a vapor phase may, in some embodiments, be directed through a vapor outlet towards a vapor collection vessel (not shown). The oil 240 and water layers 230 may then be directed to different outlets, with the oil layer collected as a commodity, and the water layer directed toward further separation and treatment. Passage through a single separation device may not complete the separation of oil and water to a satisfactory degree.

In accordance with one or more embodiments with further reference to FIG. 2, the water mixture effluent from device 220 may continue on to another oil water separation unit, for example, an inclined plate separator 260. In an inclined plate separator, smaller oil droplets that remained in the water layer coalesce on the inclined plates 265 into larger droplets and separate from the water layer to form an oil layer 240 separate from the water layer 230. The two layers may then be directed to different outlets. The oil layer 240 produced by the inclined plate separator 260 may be removed from the train 200, and collected as a commodity. The remaining water mixture may continue on to another separation device, for example, an induced gas flotation device 270 and/or a membrane filter 290. In an induced gas flotation device, gas or air is introduced into the water mixture, coalescing entrained oil particles and bringing them to the surface where they are separated from the water mixture, and reserved as a commodity.

Conventional oil and gas well operations that involve the introduction of water to drive oil and gas to the surface will generally include oil and water separation processes of which the above are examples. Various unit operations and their arrangements for oil and gas separation may be selected by those skilled in the art with the embodiment described above presented as a non-limiting example. At this stage in the overall extraction operation, an optimal amount of oil has been recovered, the acquisition of which was the general purpose of the operation. The remaining water mixture at this point may be reinjected either into a working oil or gas well, in a process known as waterflooding, to drive out more oil and gas. Alternatively, the water may be reinjected into a disposal well for permanent disposal.

Further alternative uses for the water may be limited, however, because even after oil and water separation processes are complete, the water mixture may still contain sufficient impurities to make it unfit for most uses according to various state and/or federal water quality standards. After separation from the oil products is complete, the remaining water mixture still retains a high amount of total dissolved solids (TDS). Non-limiting species of TDS found in produced water may include bicarbonate, calcium, chloride, magnesium, potassium, sodium, and sulfate species among others. Therefore, the waste water mixture may also go through a treatment process to prepare it for other uses.

Figure 3:
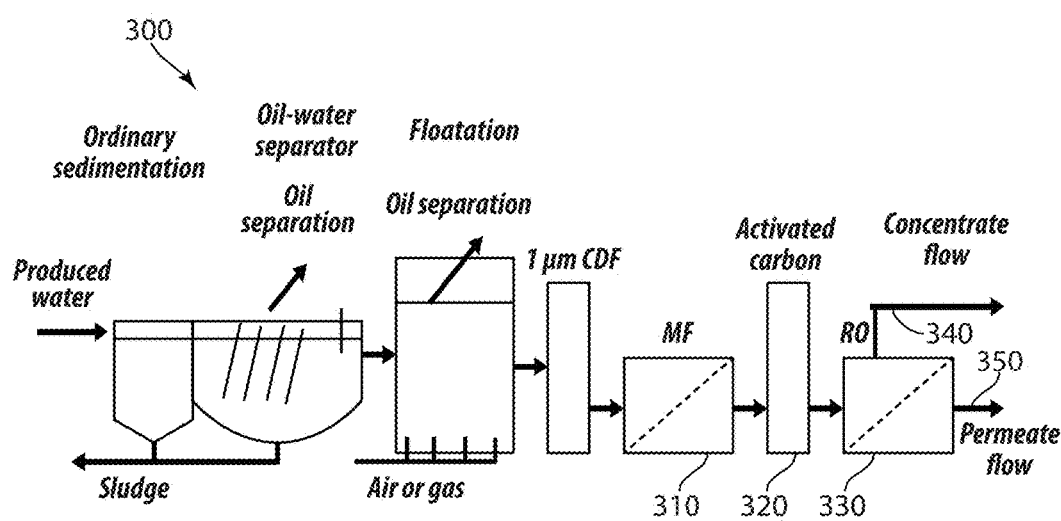
FIG. 3 presents a schematic of a produced water treatment process in accordance with one or more embodiments.

FIG. 3 presents a schematic of a method for further treatment of a water mixture after oil separation in accordance with one or more embodiments. The water treatment train 300 of the non-limiting embodiment presented may include microfiltration 310, activated carbon media 320, and/or a desalination process such as reverse osmosis or electrodialysis 330 unit operations. Microfiltration 310 typically refers to filtration with a membrane pore size ranging from 0.1 to 10 microns. However, other filtration techniques, whether they involve larger or smaller pore sizes, may be substituted for microfiltration. Another method for filtering which may be employed in the water treatment train 300 involves activated carbon media 320, e.g., activated carbon, to remove contaminants through chemical adsorption. Reverse osmosis 330 may separate contaminants by applying pressure to push a water stream through a selective membrane. Additional or alternative steps in the water treatment train 300 not shown could include coagulation and flocculation, water softening, air stripping, or any other process generally known in the art for treating water. Various combinations of such unit operations may be used for treatment.

In accordance with one or more embodiments, the result of this water treatment train 300 may be a concentrate flow 340 which comprises a reject stream that includes the impurities, and a product flow 350 which comprises purified water of a quality that may be suitable for a variety of uses. The product flow 350 may be appropriate for a number of end uses which fall within established water quality regulations. In some non-limiting embodiments, the product flow may be used to recharge aquifers, or for agricultural and irrigation purposes.

As mentioned above, the energy demands associated with water treatment may serve as a barrier to its implementation or the extent thereof. Energy delivery to remote oil and gas fields may be costly and of limited availability. Conventional energy supplies for oil and gas fields include electrical energy from an electricity grid or a series of onsite generators. In an overall extraction operation, energy is generally required to drive a variety of pumps which may bring the flow of produced water to the surface and move it through further unit operations. Energy is also demanded by oil/water separation processes, as well as by any further water treatment processes such as those described above.

In accordance with one or more embodiments, heat energy from well fluids or other sources of water to be treated may be harnessed to power oil/water separation and other water treatment processes. Treatment of produced water may be driven by heat energy captured from the produced water. Such integration may beneficially allow water treatment and overall oil or gas extraction operations to be performed in a more efficient manner.

In accordance with one or more embodiments, the temperature of the produced water may vary, such as may depend on geographical location, depth of extraction, and other factors. In some embodiments, the temperature may be relatively low, for example, between about −10 and 200° F.

Figure 4:
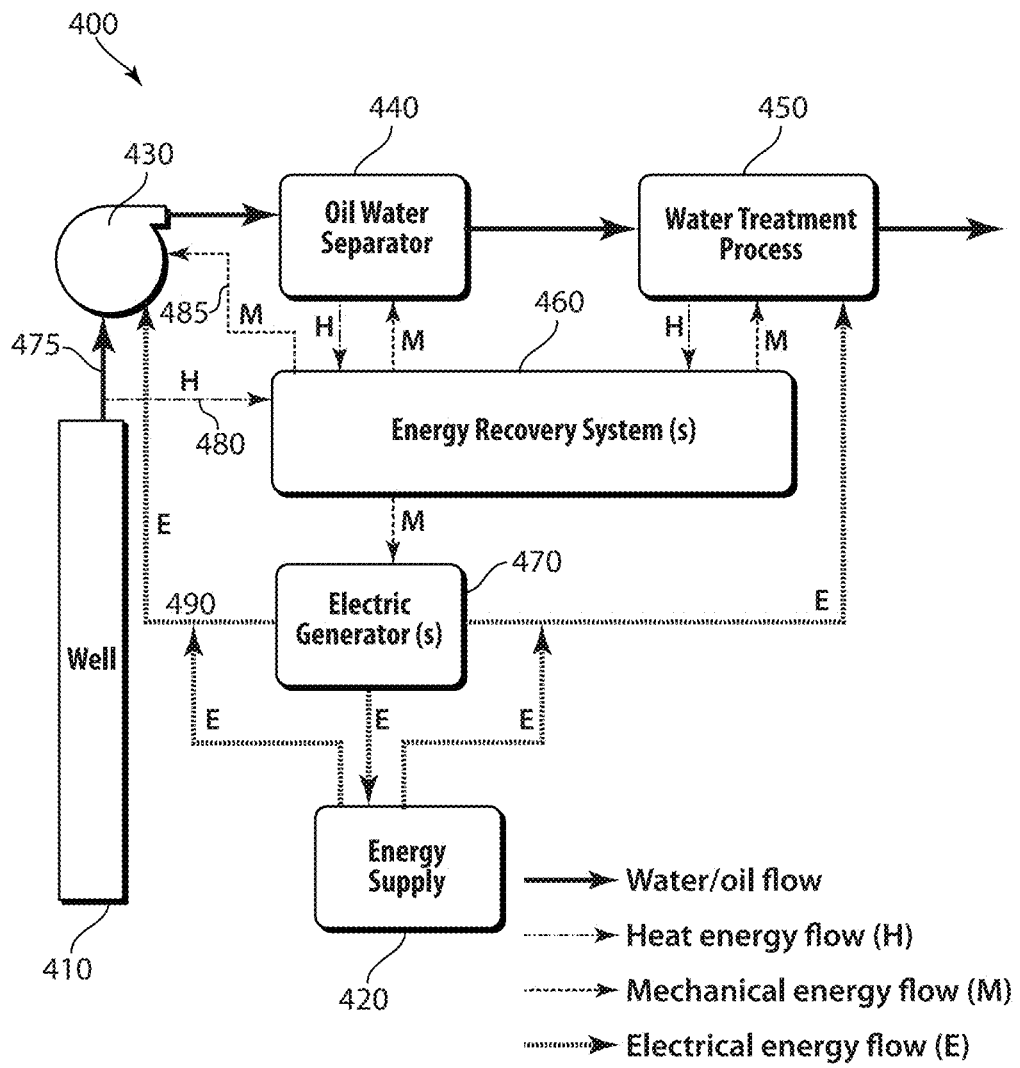
FIG. 4 presents an energy flow diagram of systems and methods in accordance with one or more embodiments.

FIG. 4 presents a non-limiting schematic of an integrated system and method in accordance with one or more embodiments. System 400 includes oil and gas recovery 440 and water treatment 450 operations. System 400 may also include an energy recovery system 460, electric generator(s) 470, and/or an energy supply 420 as discussed below. The energy recovery system 460 may convert heat energy 480 from well fluids 475 to mechanical energy 485 and/or electrical energy 490. Mechanical energy 485 and electrical energy 490 may be used to operate unit operations of not only the oil/water separation processes 440 but also the further water treatment processes 450. As discussed further in association with FIGS. 5 and 6, the heated well fluid, or heated produced water 475 may be directed to a heat exchanger which may be part of the energy recovery system 460. As the heat energy flow arrows 480 indicate, the transfer of heat from the well fluids 475 can occur at any point or multiple points along its path. One or more heat energy recovery units may be used. In some embodiments, the heat energy may be recovered prior to or during oil/water separation. For example, units such as those discussed below in relation to FIGS. 9 and 10 may be used to recover heat energy during oil/water separation. Heat energy may be recovered during a downstream water treatment process. In some non-limiting embodiments, cooling may generally be required prior to surface discharge and upstream of any membrane filtration or biological treatment used for water treatment.

As will be discussed further below, at least a portion of the heat from the well fluids may be transferred to a working fluid in a heat exchanger as part of the energy recovery system 460 in accordance with one or more embodiments. Various heat exchangers may be implemented which are capable of operating at the involved process conditions. In some non-limiting embodiments, the inlet temperature to the heat exchanger may be about 40 to 100° F. In some embodiments, the outlet temperature from the heat exchanger may be about 45 to 110° F. The heated working fluid may then be vaporized to drive a turbine, or other mechanical transfer device, thus converting the heat energy to mechanical energy in some non-limiting embodiments. Any mechanical transfer device may be used. In some embodiments, a turbine may be used. The turbine should generally be suitable for operation at the involved process temperatures as discussed herein. For example, the turbine may be a Euler turbine or a variable phase turbine. In some non-limiting embodiments, the turbine may be a two-phase turbine commercially available from Energent Corporation (CA). In other embodiments, a screw expander or other mechanical transfer device may be used.

The mechanical energy of the turbine may then be used directly or to generate electrical energy via a generator 470. The mechanical energy may be used for driving pump(s) 430, oil/water separator 440 or water treatment process 450. Other applicable methods for energy extraction may be recognized by those of ordinary skill in the art. The electrical energy 490 thus produced may then be used to directly supply or supplement the electrical energy requirements of the unit operations 440 and/or 450. If the produced electricity 490 exceeds system requirements, then the difference may be supplied to grid 420. Alternatively, if the produced electricity 490 is less than demand, then the difference may be supplied from the grid 420.

In accordance with one or more embodiments, the turbine may be used to generate electricity. In some embodiments, the turbine may be used to provide mechanical energy to a water treatment process, for example, to directly move a pump, a mixer or other device.

In accordance with one or more embodiments, the energy recovery system may transfer mechanical energy to an oil water separator and/or a water treatment process. In some non-limiting embodiments, a rotating shaft may be implemented such that shaft energy may be used directly in an oil separator, for example, to run a mixer, or a flotation unit.

Figure 5:
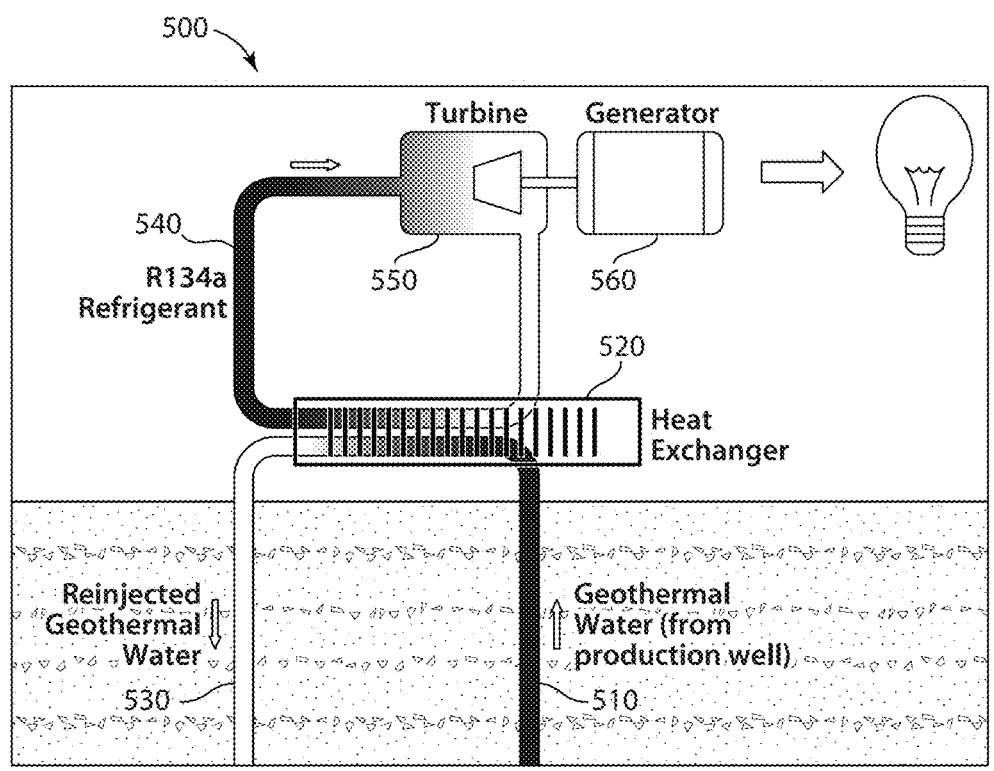
FIG. 5 presents an example of heat recovery using a working fluid to exchange and recover heat in accordance with one or more embodiments.

FIG. 5 presents a non-limiting schematic illustrating a system 500 for the exchange of heat from a well fluid to a working fluid to generate mechanical energy that may be used to operate a mechanical system or provide electricity in accordance with one or more embodiments. Heated fluid from a production well 510 passes through a heat exchanger 520 and transfers a portion of its heat to a working fluid 540, for example a refrigerant. The heated working fluid vaporizes to turn a turbine 550. The mechanical energy of the turbine 550 is transformed into electrical energy in a generator 560. The embodiment depicted in FIG. 5 may operate based on an organic Rankine cycle or alternative thermodynamic energy conversion cycles such as, for example, a trilateral cycle, a variable phase cycle, or a Kalina cycle. The trilateral cycle, for example, is a thermodynamic cycle involving a substantially perfect temperature matching between the heat source and the working fluid to minimize irreversibility associated with the process and to maximize its efficiency. In contrast with more traditional thermodynamic cycles that encompass expansion of gases, the expansion of liquid may start in the saturated liquid phase forming a mixture of gas and liquid as a result. Alternative working fluids or heat cycles may be substituted for those in FIG. 5.

Figure 6:
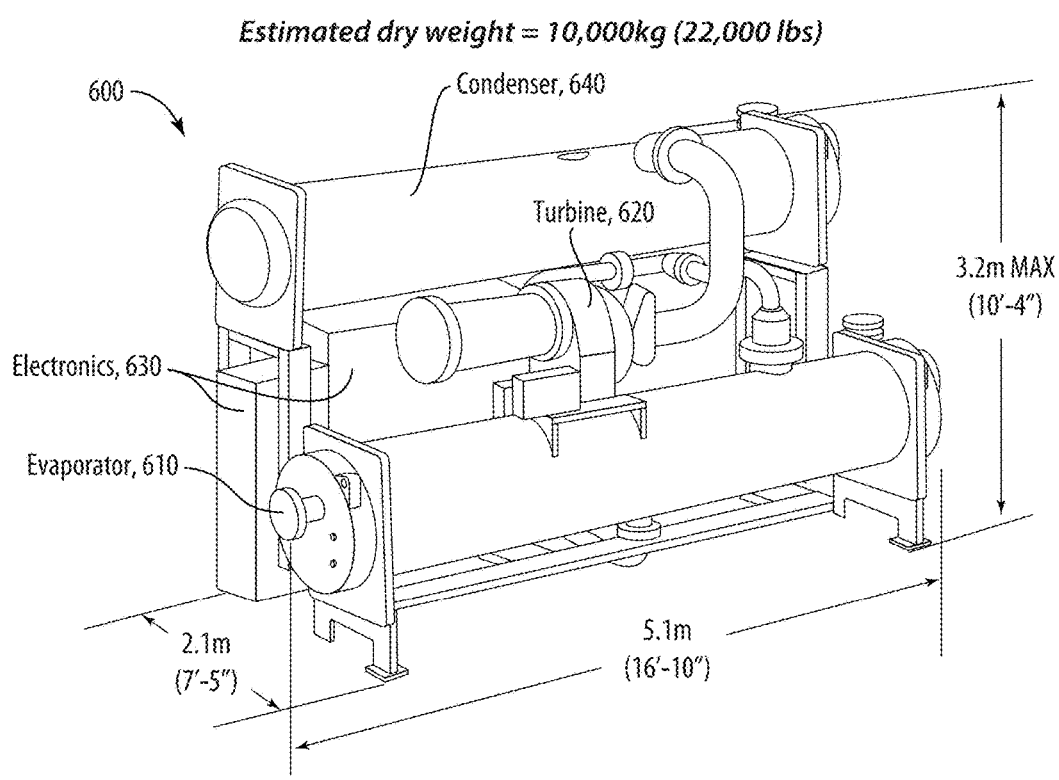
FIG. 6 presents a schematic of a generator suitable for transforming heat energy transferred from a well fluid to electrical energy in accordance with one or more embodiments.

FIG. 6 presents a non-limiting schematic of a generator 600 suitable for transforming heat energy transferred from a well fluid to electrical energy in accordance with one or more embodiments. Generator 600 may convert heat energy to mechanical energy, which may be subsequently converted to electrical energy. A working fluid, as described above, may evaporate in evaporator 610 after heat is transferred to it from extracted produced water. The evaporated fluid may perform work on a turbine 620, the mechanical energy of which may be used to produce electricity. The working fluid may then be condensed in condenser 640 before beginning the cycle again.

Figure 7:
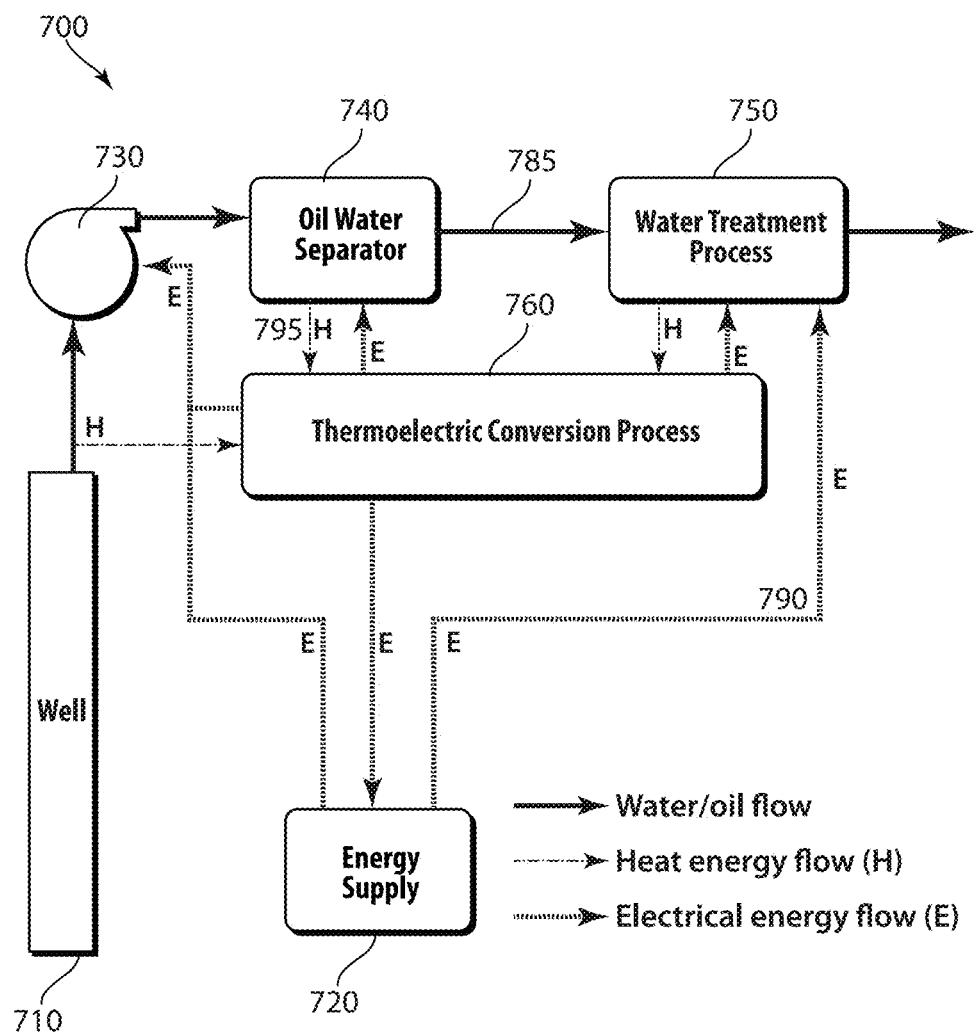
FIG. 7 presents an energy flow diagram of systems and methods in accordance with one or more embodiments.

In accordance with one or more embodiments, a thermoelectric conversion process may be used instead of a heat engine. FIG. 7 presents a non-limiting schematic of one such embodiment of an oil and gas recovery operation. System 700 includes a thermoelectric conversion process 760 and an energy supply 720. Rather than a heat engine described above, a thermoelectric conversion process 760 uses heat 785 from well fluid 795 to produce electricity 790. In some embodiments, the thermoelectric conversion process 760 may involve a thermoelectric generator described below with reference to FIG. 8. The electricity 790 may then be used to power the operations of the system 700, either driving the pump 730, powering the oil/water separations 740, or powering the water treatment process 750. If more power is produced than required by the system, the balance of the energy may be transferred to the energy supply 720, e.g. the grid. If the system requires more energy than that produced by the thermoelectric conversion process 760, then the energy supply 730 will supply the difference.

Figure 8:
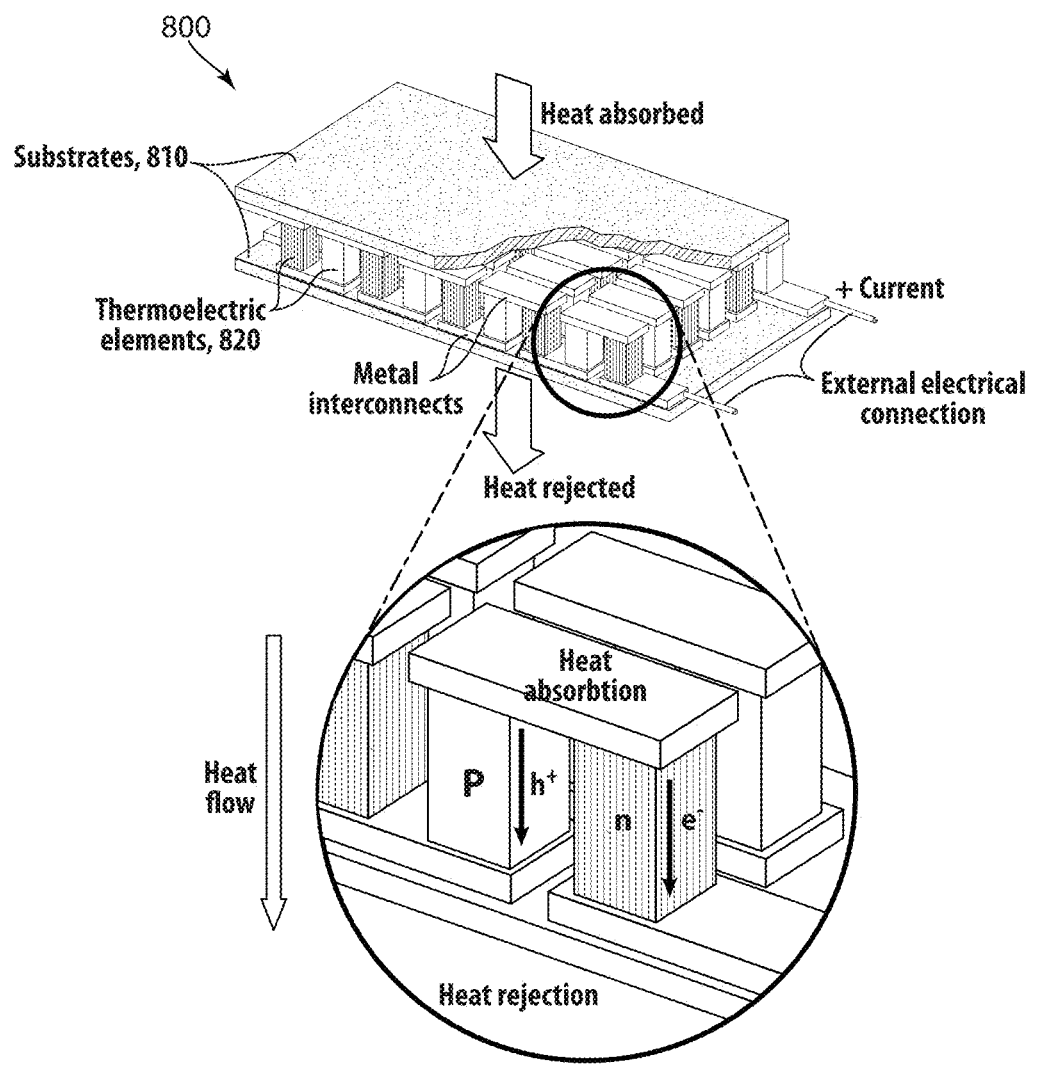
FIG. 8 presents a schematic of a thermoelectric generator in accordance with one or more embodiments.

FIG. 8 presents a schematic of a thermoelectric generator in accordance with one or more embodiments. Recaptured heat from the produced water may be used to operate a thermoelectric generator 800. In generator 800, heat is absorbed by a substrate 810 connected to thermoelectric couples 820. The thermoelectric couples 820 of thermoelectric semiconductors may be connected electrically in series and thermally in parallel to make a thermoelectric generator. The flow of heat may generally drive the free electrons to produce electrical power from heat.

Figure 9:
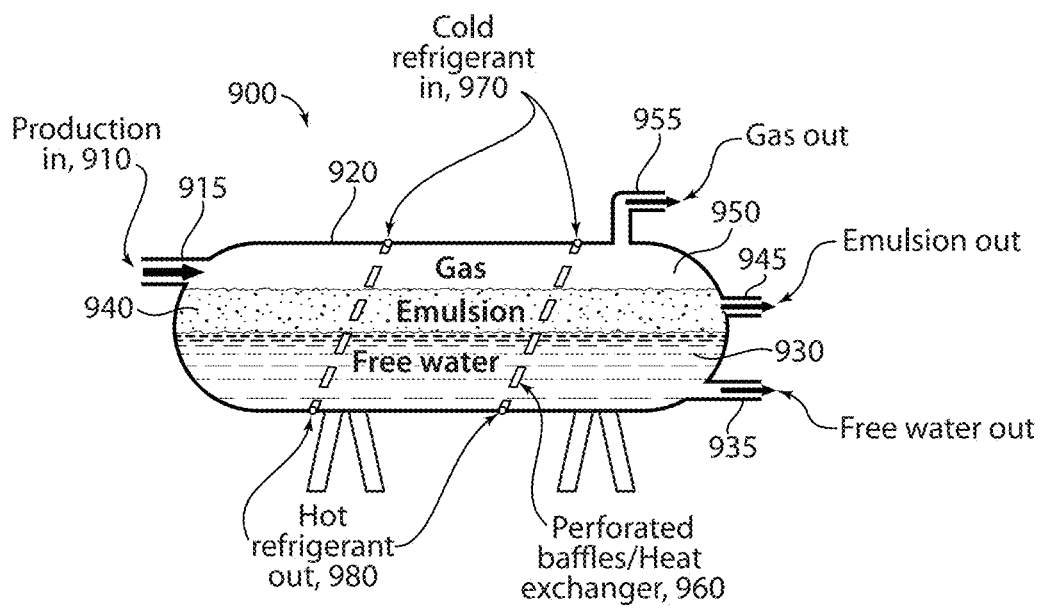
FIG. 9 presents a schematic of an integrated separator-heat exchanger in accordance with one or more embodiments.

FIG. 9 presents a schematic of an integrated separator-heat exchanger in accordance with one or more embodiments. The integrated separator-heat exchanger 900 may comprise a shell 920 and have an inlet 915 for receiving a fluid 910. The fluid 910 may be produced water. The fluid 910 may be a fluid that has already undergone some treatment. The fluid may separate out into different layers by, for example, gravity separation. The layers may include a water layer 930 and an emulsion layer 940 that may include carbon species or oils. The layers may also include a gas layer 950. The different layers may be directed to different outlets. For example, the water layer may be directed to outlet 935. The emulsion layer may be directed to outlet 945. The gas layer may be directed to outlet 955. Having exited the integrated separator-heat exchanger 900 the various layers may be directed to further treatment (for example, further separations treatments), storage, or disposed of as waste, according to the requirements of the operation.

The integrated separator-heat exchanger 900 may also include components for providing heat exchange. For example, the integrated separator-heat exchanger 900 may include perforated baffles 960 that carry a working heat exchange fluid, for example a refrigerant. The refrigerant may be cold refrigerant 970 that receives heat from the fluid 910. The refrigerant may then exit as hot refrigerant 980. The heat energy gathered by the refrigerant may then be put to use as discussed elsewhere herein. The integrated separator-heat exchanger 900 may be incorporated into a treatment train, like those discussed in relation to FIGS. 2 and 3.

Figure 10:
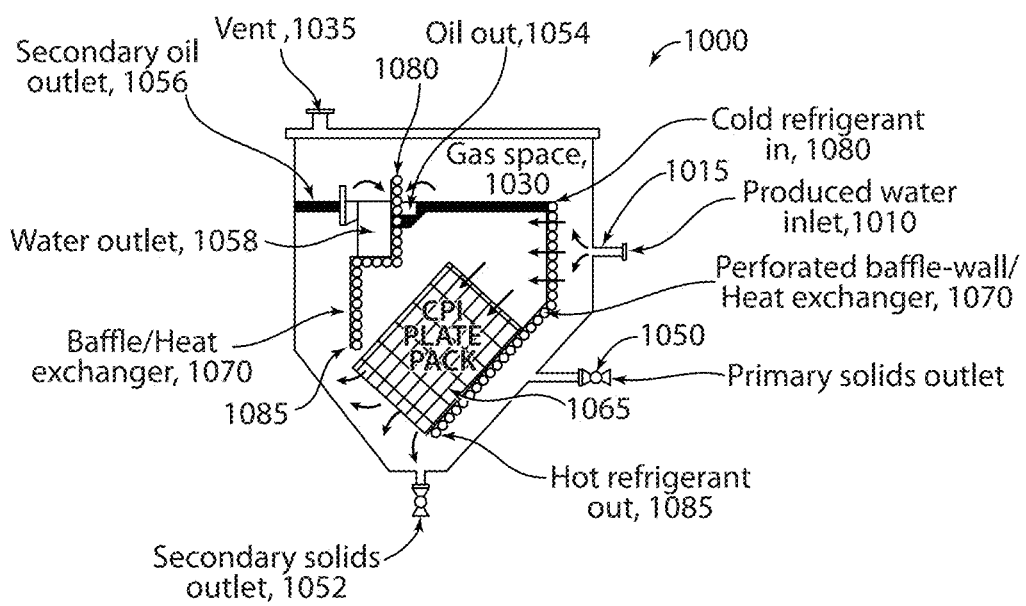
FIG. 10 presents a schematic of an integrated separator-heat exchanger in accordance with one or more embodiments.

FIG. 10 presents a schematic of an integrated separator-heat exchanger in accordance with one or more further embodiments. The integrated separator-heat exchanger 1000 may comprise a shell 1020 and have an inlet 1015 for receiving a fluid 1010. The fluid 1010 may be produced water. The fluid 1010 may be a fluid that has already undergone some treatment. The integrated separator-heat exchanger 1000 may comprise inclined plates 1065 to separate out oil or carbon species by a process like that described in relation to FIG. 2. Separated layers or species may be directed to different outlets of the integrated separator-heat exchanger 1000. For example, solids may be directed to primary solids outlet 1050 and/or secondary solids outlet 1052. Gas that enters the system may be directed to gas space 1030 and out through outlet/vent 1035. Oil may exit through outlet 1054 or secondary outlet 1056. Water may exit through outlet 1058. The various separated species may then be directed toward further treatment, storage, or be disposed of as waste, according to the requirements of the operation.

The integrated separator-heat exchanger 1000 may also include components for providing heat exchange. For example, the integrated separator-heat exchanger 1000 may include perforated baffles and/or wall 1070 including tubing for conveying a working heat exchange fluid, for example a refrigerant. The refrigerant may be cold refrigerant 1080 that receives heat from the fluid 1010. The refrigerant may then exit as hot refrigerant 1085. The heat energy gathered by the refrigerant may then be put to use as discussed elsewhere herein. Multiple sets of perforated baffles/walls 1070 may be placed throughout the integrated separator-heat exchanger 1000 as required to meet demand. The integrated separator-heat exchanger 1000 may be incorporated into a treatment train, like those discussed in relation to FIGS. 2 and 3. The heat extracted by the refrigerant may cool the water-oil mixture processed by the integrated separator-heat exchanger. In some cases, the cool water-oil mixture enhances the oil-water separation process by changing density, viscosity of water and oil and solubility of organic compounds in water. In other cases the cooling effect induces convective currents in the process that are used for improving circulation and water-oil separation. In at least some embodiments, oil-liquid separation processes may be enhanced by extraction of heat from the produced water.

In accordance with one or more embodiments, energy may be harnessed from produced water and used to drive oil/water separation as well as treatment of the produced water. Recovered energy may be mechanical energy used directly to drive pumps used for water treatment. In other embodiments, mechanical energy may be converted to electrical energy directly used to drive motors used for water treatment. In some embodiments, a thermoelectric generator may be used to convert the recovered heat energy to electrical energy. Recovered energy may be more or less than that required for conveyance and treatment of the produced water. Excess energy may be delivered to an electric energy network which may provide supplemental energy when needed or otherwise serve as a backup source of power. The heat energy from the produced water may be recovered prior to separating oil from the produced water. In other embodiments, the heat energy may be recovered during treatment of the produced water. In at least some embodiments, heat may be extracted for heating and/or cooling applications. Excess recovered heat energy may be delivered to an energy network, such as a heating and/or cooling distribution network.

In accordance with one or more embodiments, the systems and methods may generally be described as having an energy recovery component or subsystem, followed by a water treatment component or subsystem.

The embodiments described herein will be further illustrated through the following example which is illustrative in nature and not intended to limit the scope of the disclosure.

EXAMPLE

The following Table illustrates a prophetic example of the electric energy that can be recovered as an oil field is developed and produced water increases.

| Item | Unit | Energy Generation Example | | |
|---|---|---|---|---|
| Temperature Inlet Water | F. | 160 | 160 | 160 |
| Temperature Outlet Water | F. | 135 | 135 | 135 |
| Flow Rate | bbl/day | 500,000 | 2,500,000 | 7,000,000 |
|  | lps | 920 | 4,601 | 12,882 |
| Produced Power | kW gross | 2,600 | 13,000 | 36,000 |
|  | kW net | 2,200 | 11,000 | 31,000 |
| Power for Desalination | kW | 2,500 | 12,300 | 34,500 |
| Excess Power | kW | (300) | (1,300) | (3,500) |
| Annual energy | kWh/y | 19,300,000 | 96,400,000 | 271,600,000 |
| Energy Price | $/kWh | $0.17 | $0.17 | $0.17 |
| Annual Avoided Cost | M$/y | 3.3 | 16.4 | 46 |
| Annual Avoided CO2 | ton CO2/y | 5,000 | 25,000 | 72,000 |

The results for power generation are based on pilot unit results for the same temperature while the results for desalination are based on a recently run pilot unit using electrodialysis reversal technology for removing the salts. It is observed that in this case with low salinity waters the energy recovered supplies about 90% of the total energy required for water desalination and conveyance for treatment. Energy expenses for desalination are the most significant processing expense in treating the water to render it suitable for reuse. The energy at this site is generated by burning crude oil in a combustion engine. There are also significant environmental benefits by avoiding green house gas emissions from burning the oil. The last row on the Table indicates the Tons of CO2 that will be avoided with the technology as a result of displacing the use of a fossil fuel to generate electric power with a renewable energy source such as natural water heat. The results from the pilot energy recovery unit indicate that the systems are sensitive to the influent temperature to the unit. There is therefore an incentive to harvest the heat before it is dissipated.

The phraseology and terminology used herein is for the purpose of description and should not be regarded as limiting. The use of "including," "comprising," "involving," "having," "containing," "characterized by," "characterized in that," and variations thereof herein is meant to encompass the items listed thereafter, equivalents thereof, as well as alternate embodiments consisting of the items listed thereafter exclusively. Use of ordinal terms such as "first," "second," "third," and the like in the claims to modify a claim element does not by itself connote any priority.

While exemplary embodiments have been disclosed, many modifications, additions, and deletions may be made therein without departing from the spirit and scope of the disclosure and its equivalents, as set forth in the following claims.

Those skilled in the art would readily appreciate that the various parameters and configurations described herein are meant to be exemplary and that actual parameters and configurations will depend upon the specific application for which the embodiments are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, the disclosed systems and methods may be practiced otherwise than as specifically described. The present systems and methods are directed to each individual feature described herein. In addition, any combination of two or more such features, if not mutually inconsistent, is included within the scope of the present disclosure.

Further, it is to be appreciated that various alterations, modifications, and improvements will readily occur to those skilled in the art. Such alterations, modifications, and improvements are intended to be part of this disclosure, and are intended to be within the spirit and scope of the disclosure. For example, an existing system or method may be modified to utilize or incorporate any one or more aspects of the disclosure. Thus, in some embodiments, embodiments may involve configuring an existing energy extraction system or method to include the integration described herein. For example, an existing system or process may be retrofitted to involve use of heat from produced water to drive treatment of the produced water in accordance with one or more embodiments. Accordingly, the foregoing description and drawings are by way of example only. Further, the depictions in the drawings do not limit the disclosures to the particularly illustrated representations.

What is claimed is:

1. A method for treating produced water, comprising:
    separating the produced water to form a gas, an oil emulsion, and water;
    recovering heat energy from the produced water during separation of the produced water by using an integrated separator-heat exchanger;
    converting the recovered heat energy to mechanical and/or electrical energy; and
    using the mechanical and/or electrical energy to directly drive treatment of the produced water.

2. The method of claim 1, further comprising converting the mechanical energy to electrical energy.

3. The method of claim 1, comprising using a heat engine in fluid communication with a generator to convert the recovered heat energy to electrical energy.

4. The method of claim 1, comprising using a thermoelectric generator to convert the recovered heat energy to electrical energy.

5. The method of claim 1, further comprising delivering excess recovered heat energy to a distribution network.

6. The method of claim 1, further comprising using an energy network to supplement the recovered heat energy or as a backup source of power.

7. A system for providing energy to treat produced water, comprising:
 a source of produced water having heat energy;
 a water treatment subsystem having an energy requirement and comprising an oil-water separator fluidly connected downstream of the source of produced water; and
 an energy recovery subsystem comprising a heat exchanger and configured to convert a portion of the heat energy from the produced water to mechanical and/or electrical energy, and to supply at least a portion of the energy requirement of the water treatment subsystem,
 the oil-water separator being integrated with the heat exchanger and configured to separate the produced water to form a gas, an oil emulsion, and water while recovering heat energy from the produced water.

8. The system of claim 7, wherein the energy recovery subsystem comprises a generator disposed in communication with a turbine to generate electrical energy.

9. The system of claim 8, wherein the turbine comprises a two-phase turbine.

10. The system of claim 7, wherein the water treatment subsystem comprises at least one of a microfiltration unit, an activated carbon media unit, a reverse osmosis unit, and an electrodialysis unit.

11. The system of claim 7, wherein the energy recovery subsystem comprises a heat engine configured to operate in accordance with a trilateral thermodynamic energy conversion cycle.

12. The system of claim 7, wherein the heat energy is used in a heating or cooling application.

13. The method of claim 1, wherein the mechanical and/or electrical energy is used to directly drive a desalination operation associated with treatment of the produced water.

14. The method of claim 13, wherein the mechanical and/or electrical energy supplies at least 90% of a total energy requirement of the desalination operation.

15. The system of claim 7, wherein the oil-water separator has an inlet fluidly connected downstream of the source of produced water, a gas outlet, an oil emulsion outlet, and a water outlet fluidly connected to at least one of a microfiltration unit, an activated carbon media unit, a reverse osmosis unit, and an electrodialysis unit.

16. The system of claim 7, wherein the system is associated with an oil and gas extraction operation.

17. The system of claim 10, wherein the energy recovery subsystem is configured to supply at least 90% of a total energy requirement of the electrodialysis unit.

* * * * *